United States Patent [19]

Hikmet et al.

[11] Patent Number: 5,178,710
[45] Date of Patent: Jan. 12, 1993

[54] BONDING USING A DIFUNCTIONAL LIQUID CRYSTALLINE MONOMER ADHESIVE UNDER AN APPLIED FORCE FIELD

[75] Inventors: Rifat A. M. Hikmet; Dirk J. Broer; Robert G. Gossink, all of Eindhoven, Netherlands

[73] Assignee: U.S. Philips Corporation, New York, N.Y.

[21] Appl. No.: 857,711

[22] Filed: Mar. 25, 1992

Related U.S. Application Data

[63] Continuation of Ser. No. 423,905, Oct. 19, 1989, abandoned.

[30] Foreign Application Priority Data

Nov. 2, 1988 [NL] Netherlands .................. 8802683

[51] Int. Cl.⁵ .............................................. B32B 31/00
[52] U.S. Cl. .................................. 156/272.2; 156/275.5; 156/275.7; 156/332
[58] Field of Search ............... 156/99, 272.2, 273.1, 156/275.5, 275.7, 332, 273.5

[56] References Cited

U.S. PATENT DOCUMENTS

| | | | |
|---|---|---|---|
| 3,073,732 | 1/1963 | Hunsdiecker | 156/272.4 X |
| 3,232,811 | 2/1966 | Coulter et al. | 156/275.7 X |
| 4,172,916 | 10/1979 | Watson | 156/275.7 X |
| 4,222,635 | 9/1980 | Jülke | 156/275.5 X |
| 4,242,388 | 12/1980 | Kaufmann | 156/99 X |
| 4,614,619 | 9/1986 | Shannon | 252/299.7 X |
| 4,615,962 | 10/1986 | Garito | 427/53.1 X |
| 4,637,896 | 1/1987 | Shannon | 252/299.7 |
| 4,683,327 | 7/1987 | Stackman | 560/86 |
| 4,721,648 | 1/1988 | Kleine-Doepke | 156/275.5 X |
| 4,725,460 | 2/1988 | Matsuo et al. | 156/308.2 X |
| 4,749,261 | 6/1988 | McLaughlin et al. | 350/339 R |
| 4,810,433 | 3/1989 | Takayanagi et al. | 264/22 |
| 4,892,392 | 1/1990 | Broer | 427/54.1 X |
| 4,900,387 | 2/1990 | Johnson | 156/272.2 |
| 4,925,708 | 5/1990 | Waters et al. | 156/273.1 X |
| 4,971,719 | 11/1990 | Vaz et al. | 252/299.5 |

OTHER PUBLICATIONS

"Solid Cholesteric Films for Optical Applications" *Polymer*, 21(12), Dec. 1980, pp. 1351-1352.

Primary Examiner—David A. Simmons
Assistant Examiner—Chester T. Barry
Attorney, Agent, or Firm—Norman N. Spain

[57] ABSTRACT

By using an adhesive layer (9) between a mount (3) and an optical component (5), which adhesive layer comprises liquid crystalline monomers, the polymerization shrinkage can be minimized in the desired directions X and Y if the monomers are oriented in the Z-direction by an external field before they are polymerized.

4 Claims, 3 Drawing Sheets

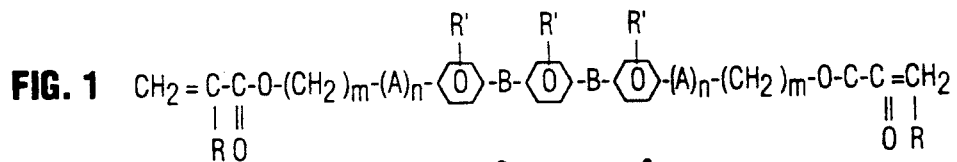
FIG. 1
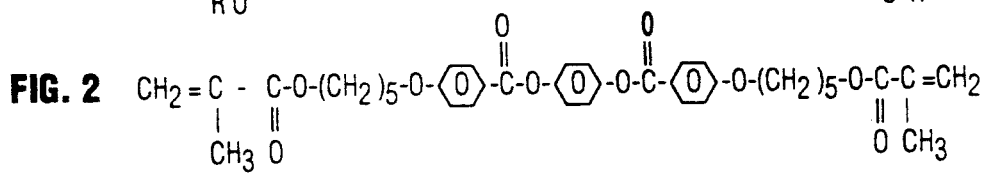
FIG. 2
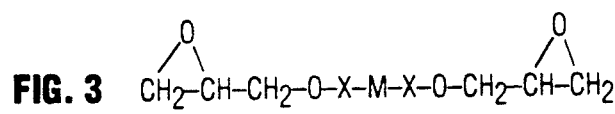
FIG. 3
FIG. 4
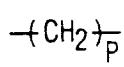
FIG. 5
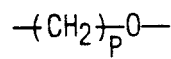
FIG. 6
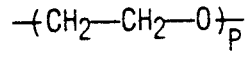

FIG. 14b $CH_2=CH-X'-M'-X'-CH=CH_2$

BONDING USING A DIFUNCTIONAL LIQUID CRYSTALLINE MONOMER ADHESIVE UNDER AN APPLIED FORCE FIELD

This is a continuation of application Ser. No. 07/423,905 filed Oct. 19, 1989 abandoned.

BACKGROUND OF THE INVENTION

The invention relates to a method of bonding two bodies using an adhesive, in which adhesive is applied between the two bodies which are then positioned relative to one another, after which the adhesive is made to cure.

The invention also relates to a composite body comprising at least two parts, at least two parts of which are bonded by means of an adhesive bond.

A method of bonding two bodies, one body being an optical component such as a mirror or lens, and the other body being a mount, is described in European Patent Specification EP 0090218. The mount is provided with a bore in which the optical component is fitted, a slot being formed between the inner wall of the mount and the outer wall of the optical component. This slot is completely or partly filled with adhesive.

Such optical assemblies are used, for example, in optical disc players. In these devices it is important that the optical parts are properly positioned relative to each other. Important in this connection is the positioning accuracy in the direction of the optical axis (Z-direction) of the optical assembly, in the directions of two axes (X- and Y-direction) extending perpendicularly to the optical axis and to one another, and in the directions of rotation about the latter axes.

The well-known method has the disadvantage that the curing of the adhesive between the optical component and the mount may bring about relatively large displacements of the optical component in the Z-direction due to the inevitable shrinkage of the adhesive layer during curing. Moreover, due to the occurrence of shrinkage stresses in the layer of adhesive there is a considerable chance that the optical component will tilt about the axes extending in the X- and Y-direction. In general, chemically-hardening adhesives comprising no or little solvent are used to cement such optical components to each other, which adhesives are based on a polymerization reaction of reactive monomers or oligomers. During this polymerization or curing reaction, which can be induced by light or heat, a volume reduction of the adhesive layer occurs which leads to shrinkage and shrinkage stresses in the adhesive layer. In order to manufacture accurate optical assemblies, so far, mechanical measures have been proposed, as described in U.S. Pat. No. 4,750,826, in which one of the walls to be cemented comprises ribs to which adhesive is applied. In U.S. Pat. No. 4,776,670 a description is given of a holder which is triangular in cross-section and which has deformable side walls. In the U.S. Pat. No. 4,818,069 it is stated that profiles are provided in the surfaces to be cemented. These mechanical solutions, however, do not solve the underlying cause of the problem, namely the shrinkage of the adhesive layer during curing.

SUMMARY OF THE INVENTION

It is an object of the invention, inter alia, to provide a method of the type mentioned in the opening paragraph, in which the two bodies to be cemented to each other are very accurately positioned relative to one another because the shrinkage and shrinkage stresses in the adhesive layer are small.

According to the invention, this object is achieved by a method as described in the opening paragraph, which is characterized in that the adhesive comprises liquid crystalline monomers. The advantage of using liquid crystalline monomers is that the monomers order themselves relative to each other, so that prior to polymerization they have a higher density than the customary isotropic monomers. Due to this, this type of materials has a smaller overall volume shrinkage than polymerized isotropic monomers.

BRIEF DESCRIPTION OF THE DRAWING

FIG. 1-13, 14a, 14b, 15-18 show formulae 1-13, 14a, 14b, 15-18 of compositions used in the present invention.

DETAILED DESCRIPTION OF THE INVENTION

Figure 7:
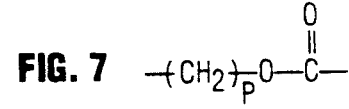
Figure 8:
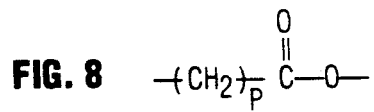
Figure 9:
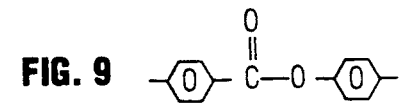
Figure 10:
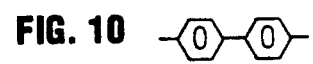
Figure 11:
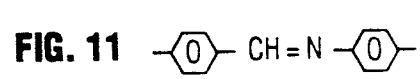
Figure 12:
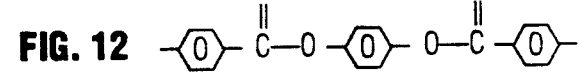
Figure 13:
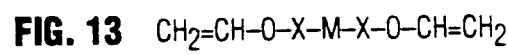
Figure 14A:
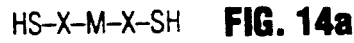
Figure 15:
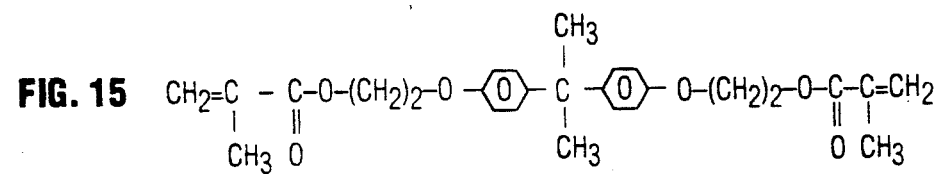
Figure 16:
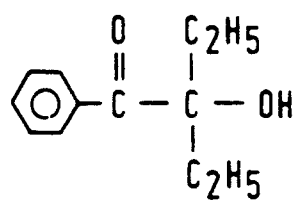
Figure 17:
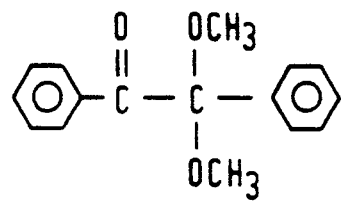
Figure 18:
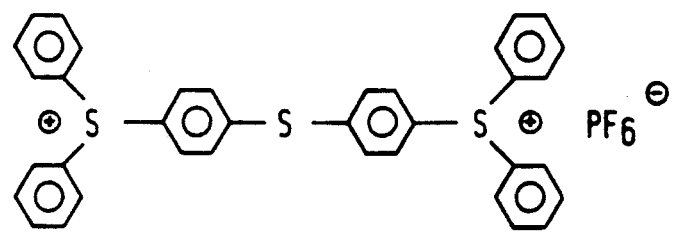

The adhesive which comprises liquid crystalline monomers is applied in a customary manner by applying one or more drops to a surface of one or both of the bodies to be joined. In the case of a narrow slit between the two bodies to be joined, use can be made of the capillary action of the slit.

According to the invention, a suitable embodiment of the method is characterized in that a di-(meth)acrylate is used as the liquid crystalline monomer. Suitable liquid crystalline di-acrylates are shown in general formula 1 of the formula sheet. In this formula:

R is a hydrogen atom or a methyl group,
R' is a hydrogen atom, an alkyl group having 1-4 carbon atoms or a halogen atom,
A is an oxygen atom or the group

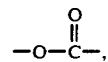

B is the group

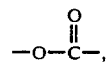

m has a value of 1-15,
n is 0 or 1.

An example of these di-(meth)acrylates is shown in formula 2 of the formula sheet. Other suitable liquid crystalline di-(meth)acrylates are stated, in, for example, European Patent Application EP 261712 (PHN 11.855), wherein the method of preparation is also described. Other suitable liquid crystalline monomers are epoxides which are represented by formula 3 of the formula sheet. In formula 3, X is a group which is represented by one of the formulae 4 up to and including 8 of the formula sheet, wherein p has a value of from 0–20, and M is a mesogenic group, a few examples of which are represented by formulae 9 up to and including 12 of the formula sheet. Other suitable liquid crystalline monomers are vinyl ethers and thiolene systems which are represented by the formulae 13 and 14a, 14b, respectively, of the formula sheet. In these formulae, X and X' have the above-stated meaning of X and M and M' have the above-stated meaning of M. The value of p is 0–20. To polymerize the thiolene systems the monomers of formulae 14a and 14b are admixed in equimolar quantities.

To initiate the polymerization reaction of the (meth-)acrylates and thiolene systems, the liquid crystalline monomers are mixed with 1 to 2% by weight of a radical initiator such as, for example, Darocur 1173 (Merck; formula 16 of the formula sheet) and Irgacure 651 a product of (Ciba-Geigy; formula 17 of the formula sheet) which are both photoinitiators or benzoyl peroxide which is a thermal initiator. Cationic initiators, for example Degacure KI 85 a product of (Degusa; formula 18 of the formula sheet) are used to cure epoxides and vinyl ethers.

According to the invention, a preferred embodiment of the method is characterized in that the liquid crystalline monomers are oriented by an external field of force before the adhesive is left to cure. Because of the high mobility of the relatively small molecules of the liquid crystalline monomers a very rapid substantially instantaneous further orientation of the molecules can be obtained by using an external field of force. The external field of force may be an electric or magentic field whose direction can be readily adjusted, so that any specific orientation of the liquid crystalline monomers can be obtained. It is also possible to previously rub the surface to be cemented in one direction, so that the liquid crystalline monomers will be oriented in the direction of rubbing. The surface to be cemented may be first provided with a suitable polymer orientation layer such as a polyimide. The liquid crystalline monomers can alternatively be oriented by previously providing microgrooves or a silane on the surface to be cemented. During polymerization, the field is maintained so that the molecules cannot become disoriented. Due to the additional ordering, the linear shrinkage perpendicular to the direction of orientation is less than the linear shrinkage in the direction of orientation. This can be attributed to the fact that in the direction perpendicular to the direction of orientation the monomer molecules are already densely packed, which hardly changes by polymerization. In many applications the inaccuracies or stresses are introduced by the linear shrinkage in one or two directions, so that the orientation of the monomers can be dramatically improved by applying the proper external field of force.

A practical embodiment of the method according to the invention is characterized in that the curing is carried out by means of exposure to UV light. For this purpose, the adhesive comprising liquid crystalline monomers contains an above-mentioned radical or cationic photoinitiator. As a result of exposure the photoinitiator decomposes into radicals or into a cation which initiate(s) polymerization of the monomers. The use of UV light of course requires that at least one of the bodies to be cemented is transparent to UV light or that the adhesive layer is otherwise accessible to UV light. In the case of applications in optical assemblies this requirement is readily fulfilled.

The invention further relates to a composite body comprising at least two parts, at least two parts of which are bonded by means of an adhesive bond, and is characterized in that the adhesive bond comprises an oriented polymer. The orientation of the polymer is selected such that shrinkage and shrinkage stresses are least desirable in directions perpendicular to the orientation of the polymer. To obtain an oriented polymer the above-mentioned methods may be applied. The two parts of the composite body exhibit a high degree of positioning accuracy relative to one another because of the very small shrinkage during curing in the directions which are important to the positioning. The shrinkage stress in the adhesive layer is also very small. Such accuracies are important in the above-mentioned optical disc players such as Laser Vision and Compact-Disc players in which positional accuracies of a few tenths of one micron and angular accuracies of $10^{-4}$ to $10^{-6}$ rad. are required. In this case, optical components such as lenses, mirrors, prisms and lasers in a suitable mount are concerned.

Although the following examples all concern optical assemblies, it will be obvious to those skilled in the art that the method according to the invention can also be applied to all adhesive bonds which require a high positioning accuracy. As has been stated above, in the case of nontransparent bodies the liquid crystalline monomers can be cured by using a thermal initiator such as benzoyl peroxide. To improve adhesion, adhesion promoters may be added, for example silanes.

The invention will be explained in greater detail by means of exemplary embodiments and with reference to the accompanying drawings.

EXAMPLE 1

Figure 19:
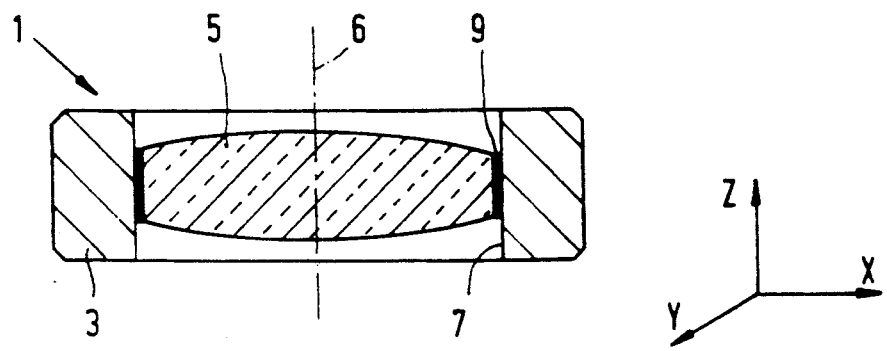
FIG. 19 is a diagrammatic sectional view of an optical assembly.

In FIG. 19, reference numeral 1 denotes a section of an optical assembly 1 comprising a synthetic resin mount 3 (polypropylene oxide) and a glass lens 5 having an optical axis 6. An adhesive is prepared which consists of a compound of formula 2 of the formula sheet and 2% by weight of Darocur 1173 a product of (Merck). The adhesive has liquid crystalline nematic properties in the temperature range of from 78° to 161° C. An inner wall 7 of the mount is rubbed with a non-fluff velvet cloth in a direction Z which extends parallel to the optical axis. A cartesian coordinates system is shown at one side of the drawing, wherein Z extends parallel to the direction of the optical axis 6. Instead of velvet, other materials such as paper gauze or cotton may alternatively be used. After the adhesive is provided on the periphery of the lens, the lens is positioned in the mount in a customary manner. An adhesive layer 9 is present between the periphery of the lens and the inner wall of the mount. The assembly 1 is then heated to a temperature of 80° C. The monomers in the adhesive layer become oriented in the direction of rubbing Z. Subsequently, the adhesive layer is exposed to UV light of 360 nm for several minutes. The U.V.-light power of the low-pressure mercury-vapour lamp to which the adhesive is exposed is 5 mW/cm$^2$. As a result of exposure the monomer molecules in the adhesive layer 9 which are oriented in the direction of rubbing are polymerized thereby fixing the orientation. The molecular axes of the polymer molecules are directed in the direction of rubbing Z. Due to the fact that the shrinkage perpendicular to the molecular axis is small, the polymerization shrinkage in two of the three main directions is small, namely in the X and Y direction. By choosing the direction of orientation of the molecules, it becomes possible to select a surface having little shrinkage in both directions.

EXAMPLE 2

Figure 20:
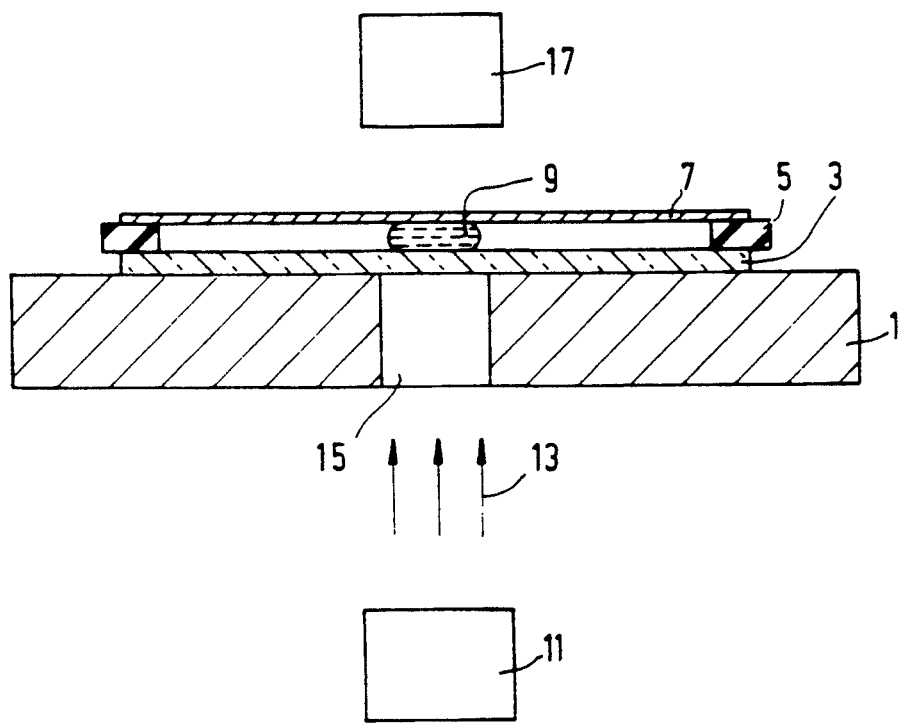
FIG. 20 is a diagrammatic view of an arrangement for measuring the shrinkage of the curing adhesive.

The polymerization shrinkage of curing monomers is measured by means of an arrangement as shown in FIG. 20. A glass plate 3 is located on a heating stage 1. A spacer 5 having a thickness of 450 μm is arranged on the glass plate along the periphery. After a drop of the adhesive 9 to be measured is applied to the glass plate, a thin reflecting metallized glass plate 7 is provided on the spacer. The adhesive has the same composition as in example 1. The volume of the drop of adhesive is 0.002 cm$^3$. The drop contacts both the glass plate 3 and the metallized glass plate 7. By means of a heating stage the temperature of the drop is increased to 100° C. The entire arrangement may be located between magnet poles (not shown) having a field strength of 10 kGauss. Measurements conducted by means of a polarizing microscope have shown that this field strength is sufficient to orient the liquid crystalline monomers. The drop is exposed by means of a low-pressure mercury vapour lamp 11 which emits UV light 13 having a wavelength of 360 nm. The UV light reaches the drop via an aperture 15 in the heating stage and via glass plate 3. As a result of the exposure the oriented monomer molecules in the drop are polymerized, thereby fixing the orientation. The drop is subject to shrinkage caused by the polymerization, which will cause the metallized glass plate 7 to become curved. This curvature is recorded by means of an interferometer 17. The curvature of the metallized glass plate is a criterion of the amount of shrinkage.

The following Table lists the results of the polymerization-shrinkage measurements. Column 2 lists the linear shrinkage when no external magnetic field is applied; columns 3 and 4 list the linear shrinkage parallel and perpendicular, respectively, to the molecular axis when an external magnetic field is applied, and column 5 lists the volume shrinkage. The volume shrinkage can be calculated from the individual values of the three main directions. By way of comparative example, the Table lists the measured values when an allied non-liquid crystalline monomer, namely Diacryl 101 a product of (Akzo) is employed. This monomer is shown in formula 15 of the formula sheet. Table

| Material | Linear shrinkage (%) | | | Volume shrinkage % |
|---|---|---|---|---|
| | unoriented | oriented ‖ mol. axis | ⊥ mol. axis | |
| Monomer acc. to formula 2 | 2.1 | 3.9 | 1.2 | 6.3 |
| Diacryl 101 | 4.0 | 4.0 | 4.0 | 12.0 |

Measurements have shown that the linear shrinkage is small when liquid crystalline monomers are used to which no external field of force is applied, and that after the application of an external field of force, which brings about additional orientation, in particular the linear shrinkage perpendicular to the molecular axis is very small. By choosing the direction of orientation, a surface can be selected having a very small shrinkage in both directions. According to the Table, the linear shrinkage in said surface upon polymerization at 100° C. will not be 4% as in the case of Diacryl 101 but only 1.2%.

We claim:

1. A method of bonding two bodies in which adhesive is applied on both of said bodies, after which the bodies are positioned relative to one another so that the adhesive contacts both bodies and the adhesive is made to cure subsequently, characterized in that the adhesive comprises difunctional liquid crystalline groups having two polymerizable functional groups and that said monomers are oriented parallel to the surface to be bonded by the application of an external field of force and said field is maintained during curing.

2. A method as claimed in claim 1, characterized in that a di-(meth)acrylate is used as the liquid crystalline monomer.

3. A method as claimed in claim 2 wherein the curing is carried out by means of exposure to UV light.

4. A method as claimed in claim 1, characterized in that curing is carried out by means of exposure to UV light.

* * * * *